United States Patent
Sheldahl

[15] 3,660,128
[45] May 2, 1972

[54] WAX-IN-WATER EMULSIONS

[72] Inventor: David B. Sheldahl, Griffith, Ind.
[73] Assignee: Atlantic Richfield Company
[22] Filed: Nov. 29, 1967
[21] Appl. No.: 686,686

[52] U.S. Cl. .......................................................... 106/271
[51] Int. Cl. ........................................................... C08h 9/08
[58] Field of Search .................................................. 106/271

[56] References Cited

UNITED STATES PATENTS

| | | | |
|---|---|---|---|
| 2,892,732 | 6/1959 | Rockland | 106/271 |
| 3,144,348 | 8/1964 | Turbett | 106/271 |
| 3,354,180 | 11/1967 | Ekiss | 106/271 |
| 3,374,100 | 3/1968 | Goldstein | 106/271 |

Primary Examiner—Morris Liebman
Assistant Examiner—P. R. Michl
Attorney—McLean, Morton and Boustead

[57] ABSTRACT

This invention relates to the composition of an emulsion and a method of producing a stable, wax semi-solid by aeration of the emulsion. The emulsion contains wax, water, a primary mono or secondary dialkanolamine, and an aliphatic monocarboxylic acid in the proportions of about 25 to 75 weight percent water, about 20 to 65 weight percent of a normally solid hydrocarbon wax, about 1 to 15 weight percent of the alkanolamine, and about 3.5 to 15 weight percent of the acid. The aeration can be accomplished with a relatively inert gas.

7 Claims, No Drawings

WAX-IN-WATER EMULSIONS

This invention is directed to whippable wax-in-water emulsions. More specifically, this invention concerns stable wax-in-water emulsions which can be safely prepared using relatively inexpensive materials and which can be aerated at ordinary temperatures, e.g., about 60° F. to 100° F., to form a semi-solid.

When hot paraffin wax is whipped it become aerated and opaque and can be used for decorative purposes such as candle making. Oil-soluble dyes are often added to the wax. Sequins and other decorative material will adhere to the whipped wax when it is warm. Keeping the wax warm enough to whip is generally dangerous and trouble-some due to high melting point temperatures. Spattering during whipping is both dangerous, causing burns, and troublesome since the wax must be scraped up. Also, heated wax cools rapidly and leave little time for working into useful forms.

Wax-in-water emulsions which can be whipped have been formulated to avoid some of the problems encountered when attempting to whip the hot paraffin wax itself. For instance, U.S. Pat. No. 2,892,732 disclosed whippable wax-in-water emulsions employing nonionic emulsifiers such as disubstituted amides, esters of polyoxylated ethylene glycol and various fatty acids. It has now been discovered that primary mono- and secondary dialkanolamine salts of aliphatic monocarboxylic acids are useful in making whippable wax-in-water emulsions. Not only are these ionic emulsifiers less expensive than nonionic systems but also whippable wax-in-water emulsions containing these emulsifiers can be prepared without the necessity of heating the components to excessively high and dangerous temperatures.

The wax-in-water emulsions of the invention are readily poured, and whip and become plastic-like at ordinary temperatures. Furthermore, if the emulsion of the invention is spilled it can be easily removed with water. The emulsion is colorable with food dyes and does not harden immediately, allowing more time to form and decorate it.

In the invention a whippable emulsion is formed containing about 20 to 65, preferably about 30 to 50, weight percent of hydrocarbon wax, about 1 to 15, preferably about 3 to 7, weight percent of a primary mono or secondary dialkanolamine, about 3.5 to 15, preferably about 5 to 10 weight percent of an aliphatic monocarboxylic acid and about 25 to 75, preferably about 40 to 60, weight percent of water. A gas which is inert under the conditions of emulsification, e.g., air, $N_2$, $H_2$, He, etc., is introduced into the emulsion by, for instance, whipping, beating, etc., forming a substantially solid phase and a substantially gaseous phase distributed throughout the solid phase. The amount of inert gas introduced is usually up to about 50 percent, often at least about 10 percent and preferably about 15 to 40 percent, by volume of the aerated material.

The hydrocarbon waxes useful in the composition of the invention include those having a melting point of up to about 200° F., preferably about 120° F. to 160° F. These waxes include paraffin petroleum waxes as well as beeswax, lanolin, carnauba wax, ouricuri wax, candelilla wax, Madagascar wax, Douglas fir wax, japan wax, apple cuticle wax, microcrystalline petroleum waxes, corn seed and sunflower seed waxes, jojoba wax, etc.

Aliphatic, including cycloaliphatic, hydrocarbon monocarboxylic acids of from about 10 to 32 carbon atoms can be employed to form the alkanolamine salt. The acids can also contain non-deleterious substituents. Suitable aliphatic monocarboxylic acids include saturated fatty acids such as lauric, myristic, palmitic, stearic, behenic, cerotic, as well as mono or poly olefinically unsaturated fatty acids such as oleic, linoleic, linolenic, ricinoleic, tall oil acids, rosin acids, etc.

The suitable alkanolamines include mono- and dialkanolamines of from about one to eight carbon atoms, preferably about two to four carbon atoms, in the alkanol groups. Emulsions formed using trialkanolamines will not whip. Some examples of useful mono- and dialkanolamines of the invention are mono and diethanolamine, mono and dipropanolamine, mono and dibutanolamine, etc., and mixtures of these materials. The alkanolamine salts of the acid may either be made in situ or prepared before addition to the molten wax, but the former is preferred. The alkanolamine is generally present in at least the stoichiometric amount based on the acid, and preferably the amine is in excess of the acid to provide protection against freezing of the emulsion.

In preparing the emulsion, the mono- or dialkanolamine, aliphatic monocarboxylic acid, and up to about 30, preferably about 15 to 30, weight percent of the wax can be heated to above the melting point of the wax and below the boiling point of water, e.g., about 150° F. to 210° F., and the mixture blended. To this mixture up to about 40, preferably about 15 to 30, weight percent of the total amount of water to be included is added slowly, preferably in portions amounting to about 15 percent of the addition. The remaining portion of the wax is added slowly and the mixture stirred until the wax is thoroughly blended into the mass. Finally the remaining water is slowly blended into the mass, for instance, in about the same proportions as the first addition. All of the components can be added at approximately the same temperature. After the emulsion has been thoroughly mixed and allowed to cool to ordinary temperatures, e.g. about 60° F. to 100° F., it can be aerated by whipping or bubbling air or other inert gas through the emulsion.

The following examples are included to illustrate the invention and should not be considered limiting.

EXAMPLE I

| Blending Sequence | Ingredient | Weight, % |
|---|---|---|
| 1 | Paraffin Petroleum Wax (M.P. 135–137° F.) | 10 |
| 2 | Stearic Acid | 5 |
| 3 | Diethanolamine | 3 |
| 4 | Water | 10 |
| 5 | Paraffin Wax (M.P. 135–137° F.) | 33 |
| 6 | Water | 39 |

The wax, stearic acid and diethanolamine were blended at 150° F. About 15 percent of the first portion of water, heated to 150° F. (sequence 4) was added at a time. Each addition of water was worked in before another addition was made. Stirring was continued until the mass thickened to the consistency of heavy grease. The balance of paraffin wax was added slowly. The wax was heated to 150° F. before being added. The stirring was continued until the paraffin wax was thoroughly blended into the aforementioned mass. The final water was heated to 150° F. and added in small portions as when the initial water was added, making sure each portion was worked in before another addition was made. When the above emulsion was cooled to room temperature it had the consistency of coffee cream. When it was whipped at room temperature it formed a plastic material that could be used for decorative purposes by extruding, molding, forming, etc. It did not have to be used immediately as it retained its plasticity for several hours. It did thereafter dry out and retain its desired shape.

EXAMPLE II

An emulsion was prepared in a manner similar to that used for Example I using the following ingredients:

| Blending Sequence | Ingredient | Weight, % |
|---|---|---|
| 1 | Paraffin Wax (M.P. 135–137° F.) | 10 |
| 2 | Stearic Acid | 5 |
| 3 | Monoethanolamine | 1.75 |

| Blending Sequence | Ingredient | Weight, % |
|---|---|---|
| 4 | Water | 10 |
| 5 | Paraffin Wax (M.P. 135–137° F.) | 34.25 |
| 6 | Water | 39 |

The resultant emulsion was similar to Example I and could be whipped at ordinary temperatures.

EXAMPLE III

A whippable emulsion was also prepared in a manner similar to Example I with the following ingredients:

| Blending Sequence | Ingredient | Weight, % |
|---|---|---|
| 1 | Paraffin Wax (M.P. 135–137° F.) | 10 |
| 2 | Oleic Acid | 5 |
| 3 | Diethanolamine | 3 |
| 4 | Water | 10 |
| 5 | Paraffin Wax (M.P. 135–137° F.) | 33 |
| 6 | Water | 39 |

The resultant emulsion was similar to Example I and could be whipped at ordinary temperatures.

EXAMPLE IV

An emulsion was prepared in a manner similar to Example I with the following ingredients:

| Blending Sequence | Ingredient | Weight, % |
|---|---|---|
| 1 | Paraffin Wax (M.P. 135–137° F.) | 10 |
| 2 | Stearic Acid | 5 |
| 3 | Triethanolamine | 4.5 |
| 4 | Water | 10.0 |
| 5 | Paraffin Wax (M.P. 135– ° F.) | 31.5 |
| 6 | Water | 390 |

The resultant emulsion was similar to Example I, but could not be whipped.

It is claimed:

1. A wax semi-solid comprising a substantially solid phase which comprises a mixture of about 25 to 75 weight percent water, an alkanolamine salt of about 3.5 to 15 weight percent of an aliphatic hydrocarbon monocarboxylic acid of about 10 to 32 carbon atoms and about 1 to 15 weight percent of an alkanolamine selected from the group consisting of primary monoalkanolamines and secondary dialkanolamines of about one to eight carbon atoms in said alkanol groups, about 20 to 65 weight percent of a normally solid hydrocarbon wax having a melting point of up to about 200°F., each of said weight percents based upon said solid phase; and a gaseous phase distributed in said solid phase, said gas phase constituting about 10 to 50 percent of the volume of said semi-solid.

2. A wax semi-solid of claim 1 wherein the solid phase mixture comprises about 40 to 60 weight percent water, about 5 to 10 weight percent of the aliphatic hydrocarbon monocarboxylic acid, about 3 to 7 weight percent of the alkanolamine and in an amount at least in stoichiometric proportions to the acid, said alkanolamine having two to four carbon atoms, in the alkanol group, and about 30 to 50 weight percent of a hydrocarbon wax having a melting point of about 120° F. to 1602 F.

3. The composition of claim 2 wherein said gas is air.

4. The composition of claim 2 wherein said alkanolamine is in stoichiometric excess of said acid.

5. The composition of claim 2 wherein said monocarboxylic acid is stearic acid or oleic acid and the alkanolamine is monoethanolamine or diethanolamine.

6. The composition of claim 5 wherein said gas is air.

7. The composition of claim 5 wherein said wax is paraffin petroleum wax.

* * * * *

PO-1050
(5/69)

UNITED STATES PATENT OFFICE
CERTIFICATE OF CORRECTION

Patent No. 3,660,128          Dated May 2, 1972

Inventor(s) David B. Sheldahl

It is certified that error appears in the above-identified patent and that said Letters Patent are hereby corrected as shown below:

Column 4, line 30, delete "1602 F." and insert in place thereof -- 160°F.--

Signed and sealed this 22nd day of August 1972.

(SEAL)
Attest:

EDWARD M. FLETCHER, JR.
Attesting Officer

ROBERT GOTTSCHALK
Commissioner of Patents